May 20, 1924.

V. BREUER ET AL 1,494,885

AUTOMOBILE BUMPER

Filed June 14, 1923     2 Sheets-Sheet 1

May 20, 1924.

V. BREUER ET AL 1,494,885

AUTOMOBILE BUMPER

Filed June 14, 1923     2 Sheets-Sheet 2

INVENTORS
V. Breuer + P. Leschnik
BY
Sigmund Herzog
ATTORNEY

Patented May 20, 1924.

1,494,885

UNITED STATES PATENT OFFICE.

VLADIMIR BREUER AND PHILIP LESCHNIK, OF NEW YORK, N. Y.

AUTOMOBILE BUMPER.

Application filed June 14, 1923. Serial No. 645,363.

*To all whom it may concern:*

Be it known that we, VLADIMIR BREUER and PHILIP LESCHNIK, citizens of the United States, and residents of the city of New York, in the counties of Queens and New York, respectively, and State of New York, have invented certain new and useful Improvements in Automobile Bumpers, of which the following is a specification.

The present invention relates to improvements in bumpers for automobiles, and has for its main object to provide a device of this type which is simple in construction, efficient in operation, durable in use, and which may be readily mounted on the automobile.

Another object of the invention is to produce a bumper of the character mentioned which is capable of manufacture on a commercial scale, or in other words one which is not so difficult to make as to be beyond the reasonable cost of such a contrivance.

With these and other objects in view, which will more fully appear as the nature of the invention is better understood, the same consists in the combination, arrangement and construction of parts hereinafter described, pointed out in the appended claim and illustrated in the accompanying drawings, it being understood that many changes may be made in the size and proportion of the several parts and details of construction within the scope of the appended claim, without departing from the spirit or sacrificing any of the advantages of the invention.

A few of the many possible embodiments of the invention are illustrated in the accompanying drawings, in which:—

Figure 1:
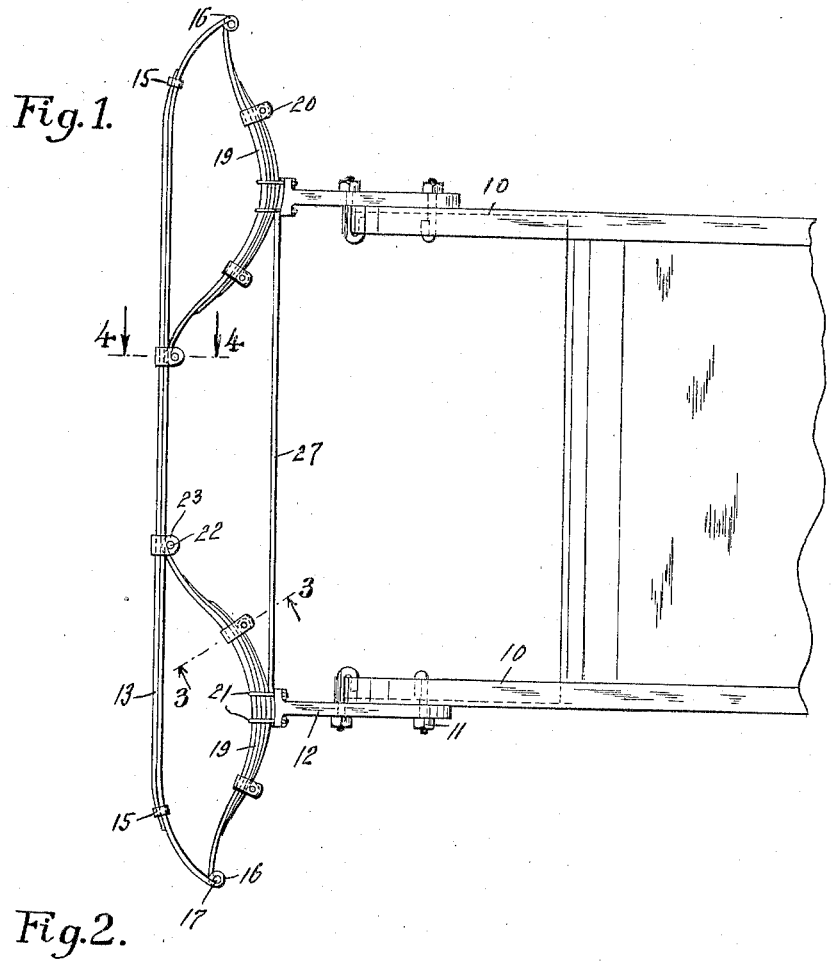
Figure 2:
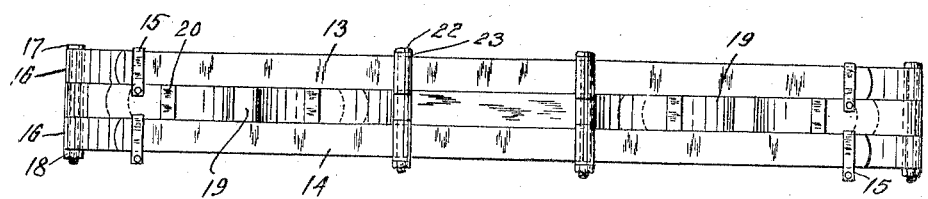
Figure 4:
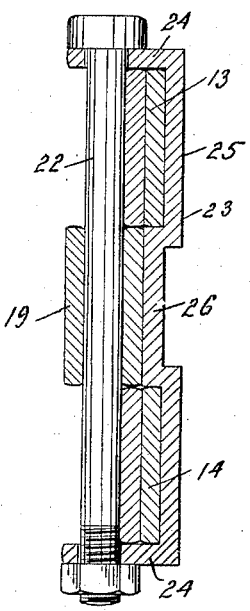
Figure 5:
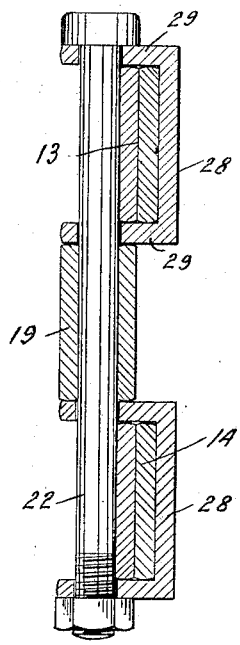
Figure 6:
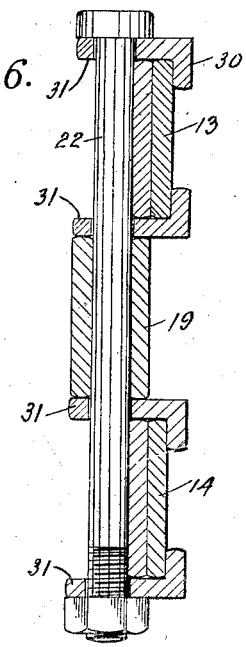
Figure 3:
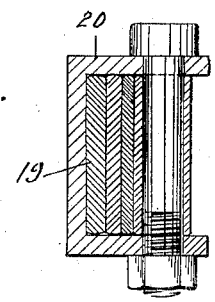

Figure 1 is a top plan view of the front portion of an automobile frame having a bumper, constructed in accordance with the present invention, mounted thereon; Fig. 2 is a front elevation of the bumper; Fig. 3 is a section taken on line 3—3 of Fig. 1, on a larger scale; Fig. 4 is a section taken on line 4—4 of Fig. 1, also on a larger scale; and Figs. 5 and 6 are sections similar to the one shown in Fig. 4 of modifications of the invention.

Referring now first to Figs. 1 to 4, inclusive, of the drawings, the numerals 10 indicate the front end portions of the longitudinal frame members of a motor vehicle, to which are attached in any suitable manner, for instance by bolts 11, forwardly projecting substantially horizontally extending supports 12, carrying the bumper.

The bumper comprises two sets of transversely extending spring bars 13 and 14, the bars of each set being united by clips 15 adjacent their ends. These two sets of spring bars extend parallel in a vertical plane and are spaced, as clearly shown in Fig. 2 of the drawings, their ends, which project beyond the sides of the automobile frame, being curved and formed into tubular terminals 16. The terminals of one set are in registering positions with those of the other set. Through the registering terminals 16 of the spring bars extend headed screwbolts 17, the threads of which mesh with nuts 18. With each bolt 17 engages a laminated spring 19. These springs are each substantially semi-elliptic and comprise each any suitable number of leaves. The laminated springs are disposed in rear of the two sets of spring bars 13 and 14, as clearly shown in Fig. 1 of the drawings, the outer ends of the longest leaves thereof being wound around the respective bolts 17 between the tubular terminals 16. The laminæ of each spring 19 are held together by clips 20, each laminated spring being attached to the respective support 12 by clips 21. The inner end of the longest leaf of each spring 19 is bent around a screw bolt 22, which is carried by a substantially U-shaped slide 23, the latter being mounted upon the two sets of spring bars 13 and 14.

One of the slides is shown in detail in Fig. 4 of the drawings, it including two horizontal flanges 24, united by a vertical web 25. The flanges 24 engage the upper and underfaces, respectively, of the two sets of spring bars 13 and 14, while the vertical flange abuts against the inner face of the said spring bars. The central portion 26 of the vertical web 25 is bent inwards and abuts against the inner end of the longest leaf of the respective laminated spring 19.

The clips 21 serve at the same time to attach to the two supports 12 a transverse connecting bar 27.

The bumper is made, preferably, of spring steel throughout and yields thus readily to forces exerted upon it in any direction. In case the bumper strikes an object, it yields freely thereto, a combination spring action being obtained which, while rendering the bumper resilient in operation, imparts to it great strength, the laminated springs 19 reinforcing the spring bars 13 and 14, and the connecting bar 27 preventing a deformation of the two sets of spring bars. Danger of injuring the vehicle is thus reduced to a minimum, and so is also injury to persons, struck by the vehicle in motion, obviated to a large extent.

The modification illustrated in Fig. 5 differs from the one above described in that each slide thereof is made of two sections, denoted by the numerals 28, each being U-shaped in configuration and embracing one set of spring bars. The screw-bolts 22 extend in this case through the horizontal webs 29 of each slide section. Otherwise the construction and operation of the elements are the same as of the device illustrated in Figs. 1 to 4, inclusive, of the drawings.

The construction shown in Fig. 6 differs from the one above described in that the slides 30 thereof are each made of four sections, denoted by the numeral 31, with each of the sets of spring bars being associated four elements 31.

What we claim is:—

A bumper for motor vehicles, comprising two supports adapted to be attached to the end portion of a vehicle frame, two semi-elliptic laminated springs secured adjacent their middle portions to said supports, said springs extending forwardly and their outer ends projecting sidewardly beyond the vehicle frame, a bolt extending through the outer end of each laminated spring, each bolt projecting above and below the respective spring, two spring bars disposed in front of said laminated springs, one above said laminated springs and the other one below the same, said spring bars connecting said bolts, and two slides on said spring bars, each slide carrying a bolt to which the inner end of one of said laminated springs is secured.

Signed at New York, in the county of New York, and State of New York, this 8th day of June A. D. 1923.

VLADIMIR BREUER.
PHILIP LESCHNIK.